US010138790B2

(12) United States Patent
Li

(10) Patent No.: US 10,138,790 B2
(45) Date of Patent: Nov. 27, 2018

(54) HEAT RECOVERY DEVICE OF A VEHICLE AND AN ASSEMBLY HAVING THE SAME

(71) Applicant: FORD GLOBAL TECHNOLOGIES, LLC, Dearborn, MI (US)

(72) Inventor: Jian Li, Nanjing (CN)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 65 days.

(21) Appl. No.: 15/346,312

(22) Filed: Nov. 8, 2016

(65) Prior Publication Data

US 2017/0130634 A1    May 11, 2017

(30) Foreign Application Priority Data

Nov. 11, 2015    (CN) .......................... 2015 1 0765171

(51) Int. Cl.

| F01N 3/00 | (2006.01) |
|---|---|
| F01N 5/02 | (2006.01) |
| F01N 13/16 | (2010.01) |
| F01N 13/18 | (2010.01) |

(52) U.S. Cl.

CPC .............. *F01N 5/02* (2013.01); *F01N 13/16* (2013.01); *F01N 13/1872* (2013.01); *Y02T 10/16* (2013.01)

(58) Field of Classification Search

USPC ............. 60/298, 320, 321, 275; 123/568.12; 165/300, 166, 167, 287
See application file for complete search history.

(56) References Cited

U.S. PATENT DOCUMENTS

| 3,831,396 | A | 8/1974 | Donaldson et al. | |
|---|---|---|---|---|
| 7,926,471 | B2 * | 4/2011 | Freese, V | F02M 26/32 |
| | | | | 123/568.12 |
| 8,794,299 | B2 | 8/2014 | Barfknecht et al. | |
| 9,080,796 | B2 | 7/2015 | Shaikh et al. | |
| 9,276,188 | B2 * | 3/2016 | Bell | F01N 3/043 |
| 2007/0235164 | A1 * | 10/2007 | Miyagawa | F01N 5/02 |
| | | | | 165/104.14 |
| 2008/0066886 | A1 * | 3/2008 | Mabuchi | B60K 13/04 |
| | | | | 165/67 |
| 2009/0313972 | A1 * | 12/2009 | Freese, V | F02M 26/50 |
| | | | | 60/278 |

(Continued)

FOREIGN PATENT DOCUMENTS

| DE | 10 2010 048886 A1 | 4/2012 |
|---|---|---|
| KR | 20150072077 A | 6/2015 |

OTHER PUBLICATIONS

Website: http://www.topspeed.com/cars/lexus/2010-lexus-rx450h-ar67171.html, retrieved Apr. 9, 2015, 34 pgs.

*Primary Examiner* — Binh Q Tran

(74) *Attorney, Agent, or Firm* — Vichit Chea; Brooks Kushman P.C.

(57) ABSTRACT

A heat recovery device comprises a coolant path segment and a thermal expansion bracket. The thermal expansion bracket has two end portions supported by the coolant path segment and a middle portion supported by an exhaust gas path segment that is spaced a distance away from the coolant path segment. The thermal expansion bracket is configured to deform in response to an increase in temperature to increase the distance and decrease heat transfer between the segments.

14 Claims, 4 Drawing Sheets

(56) References Cited

U.S. PATENT DOCUMENTS

| | | | |
|---|---|---|---|
| 2013/0199750 A1* | 8/2013 | Levin | F02G 5/02 165/4 |
| 2014/0208725 A1* | 7/2014 | Schweizer | F01N 5/02 60/320 |
| 2015/0218998 A1 | 8/2015 | Ishihata et al. | |

* cited by examiner

HEAT RECOVERY DEVICE OF A VEHICLE AND AN ASSEMBLY HAVING THE SAME

CROSS-REFERENCE TO RELATED APPLICATIONS

This application claims foreign priority benefits under 35 U.S.C. § 119(a)-(d) to CN 2015 10 76 51 71.8 filed Nov. 11, 2015, which is hereby incorporated by reference in its entirety.

TECHNICAL FIELD

The present application relates to a heat recovery device of a vehicle and an assembly having the same.

BACKGROUND

During an engine cold start, it is often desirable to heat the engine to a preset temperature quickly to achieve high fuel economy. However, it is difficult for the engine to reach the preset temperature in a desired short duration. Further, in cold air conditions, there may exist a need to heat the cabin, which may further increase the time for the engine to operate at an optimized operating temperature. In another aspect, the heat of the engine exhaust gas is not utilized effectively.

SUMMARY

According to one aspect of the present disclosure, a heat recovery device is provided. The heat recovery device comprises a coolant path segment and a thermal expansion bracket. The thermal expansion bracket has two end portions supported by the coolant path segment and a middle portion supported by an exhaust gas path segment. The exhaust gas path segment is spaced a distance away from the coolant path segment. The thermal expansion bracket is configured to deform in response to an increase in temperature to increase the distance and decrease heat transfer between the segments.

In one embodiment, the thermal expansion bracket may be configured to be parallel to the coolant path segment in response to the temperature being less than a threshold.

In another embodiment, the thermal expansion bracket may include a bimetallic strip having layers with different thermal expansion coefficients.

In another embodiment, a first of the layers may be positioned closest to the exhaust gas path segment and may have a thermal expansion coefficient greater than a thermal expansion coefficient of a second of the layers.

In another embodiment, the first of the layers may be copper and the second of the layers may be steel.

According to another aspect of the present disclosure, a heat recovery assembly is provided. The heat recovery assembly comprises an exhaust gas path segment, a coolant path segment, and a thermal expansion bracket. The thermal expansion bracket is supported by the exhaust gas path segment and the coolant path segment such that a distance is defined between the segments. The thermal expansion bracket has a bimetallic strip including layers with different thermal expansion coefficients. The thermal expansion bracket is configured to deform and increase the distance in response to an increase in temperature.

In one embodiment, the bimetallic strip may include a first layer with a first thermal expansion coefficient and a second layer with a second thermal expansion coefficient less than the first thermal expansion coefficient.

In another embodiment, the first layer may be arranged between the exhaust gas path segment and the second layer.

In another embodiment, the first layer may be copper and the second layer may be steel.

In another embodiment, two end portions of the second layer may be supported by one of the coolant path segment and the exhaust gas path segment and a middle portion of the first layer may be supported by the other of the coolant path segment and the exhaust gas path segment.

In another embodiment, two end portions of the thermal expansion bracket may be supported by one of the coolant path segment and the exhaust gas path segment and a middle portion of the thermal expansion bracket may be supported by the other of the coolant path segment and the exhaust gas path segment.

In another embodiment, the thermal expansion bracket may be supported by the one of the coolant path segment and the exhaust gas path segment via a first connector and a second connector spaced apart longitudinally, and may be supported by the other of the coolant path segment and the exhaust gas path segment via a third connector positioned between the first connector and the second connector longitudinally.

In another embodiment, the exhaust gas path segment may be formed as one of a portion of an exhaust gas pipe or as an exhaust heat shield of an exhaust pipe of a vehicle.

In another embodiment, the coolant path segment may be formed as a rigid part to receive a portion of a coolant path.

In another embodiment, the coolant path segment may be in fluid communication with a cabin heater core or an engine coolant circuit of a vehicle such that it may be formed as a portion of the engine coolant circuit.

In another embodiment, the thermal expansion bracket may be parallel to the coolant path segment and the exhaust gas path segment at a cold condition, and may deform to generate a vertical displacement at a hot condition in response to a temperature increase such that a vertical distance between the segments is increased.

According to another aspect of the present disclosure, a heat recovery system for a vehicle having an engine is disclosed. The heat recovery system comprises an engine exhaust gas path, a coolant path passing through the engine, and a heat recovery assembly including a thermal expansion bracket. The thermal expansion bracket is positioned between and supported by an exhaust gas path segment of the engine exhaust gas path and a coolant path segment of the coolant path such that a vertical distance is defined. The thermal expansion bracket extends along a length of the coolant path segment.

In one embodiment, the coolant path may include a heater core through which coolant passes to deliver heat from the coolant to a cabin of the vehicle.

In another embodiment, the thermal expansion bracket may be configured to be linear and parallel to the coolant path segment and the exhaust gas path segment at a cold condition, and may be configured to deform in response to a hot condition such that a vertical displacement is generated to increase the vertical distance between the coolant path segment and the exhaust gas path segment.

In another embodiment, the thermal expansion bracket may comprise a bimetallic strip including layers with different thermal expansion coefficients.

One or more advantageous features as described herein will be readily apparent from the following detailed description of one or more embodiments when taken in connection with the accompanying drawings.

BRIEF DESCRIPTION OF THE DRAWINGS

For a more complete understanding of one or more embodiments of the present invention, reference is now made to the one or more embodiments illustrated in greater detail in the accompanying drawings and described below wherein.

DETAILED DESCRIPTION

Figure 1:
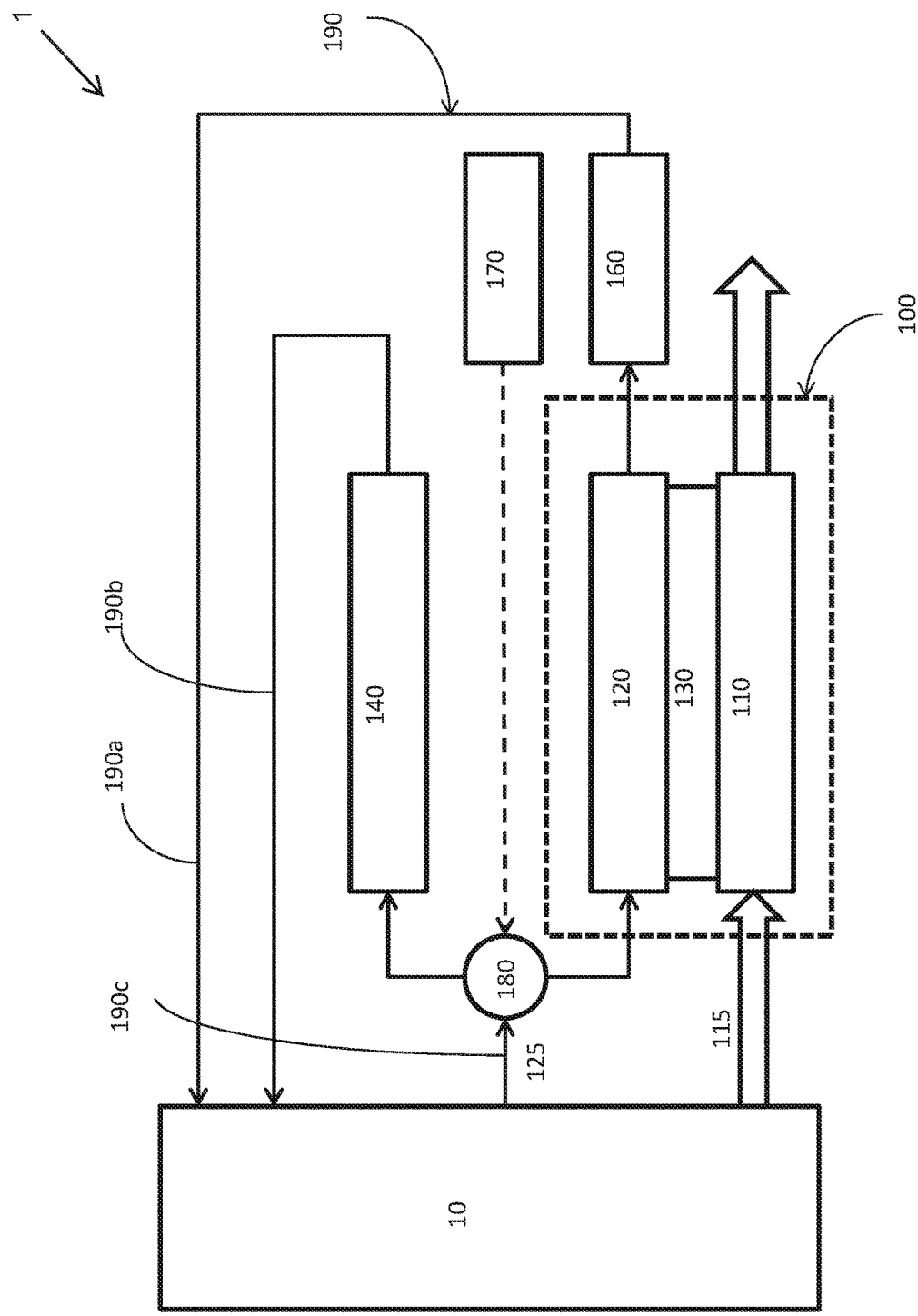
FIG. 1 schematically depicts a vehicle including a heat recovery system according to one embodiment of the present disclosure.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As referenced in the figures, the same reference numerals may be used to refer to the same parameters and components or their similar modifications and alternatives. These specific parameters and components are included as examples and are not meant to be limiting. The drawings referenced herein are schematic and associated views thereof are not necessarily drawn to scale.

In the specification, it should be understood that, the terms such as "central", "longitudinal", "lateral", "length", "width", "thickness", "above", "below", "front", "rear", "right", "left", "vertical", "horizontal", "top", "bottom", "inner", "outer", "clockwise", "counter-clockwise" should be construed to refer to the orientation as described or as shown in the drawings. These terms are merely for convenience and concision of description and do not alone indicate or imply that the device or element referred to must have a particular orientation. Thus, it cannot be understood to limit the present disclosure.

The present disclosure provides a heat recovery system of an engine that is capable of utilizing the waste heat from engine exhaust gas to shorten the duration for the engine to reach the optimized operating temperature so as to improve the fuel economy. Further, the present disclosure provides heat recovery system which utilizes the limited space in the vehicle so as to satisfy the packing requirements in modern vehicles.

As detailed herein elsewhere, a heat recovery device of a vehicle and an assembly having the same is disclosed, which could utilize exhaust waste heat differently according to different operating temperatures via a thermal expansion bracket positioned between an exhaust gas path segment and a coolant path segment. For example, the expansion bracket may deliver more heat from exhaust gas to engine coolant in a cold condition, and deliver less heat in a hot condition. The engine waste heat recovery system disclosed herein may effectively utilize the heat from engine exhaust gas to rapidly heat the engine coolant to an optimized operating temperature, and improve vehicle climate system performance such as heating or defrosting without additional heat sources such as a PTC heater. Also, because the relatively small thermal expansion bracket is provided instead of a large and complex exhaust heat exchanger, the waste heat recovery system of the present disclosure may be implemented in small vehicles with limited packaging space.

FIG. 1 schematically depicts a vehicle 1 including a heat recovery assembly according to one embodiment of the present disclosure. The heat recovery assembly includes an exhaust gas path segment; a coolant path segment; and a thermal expansion bracket connected between the exhaust gas path segment and the coolant path segment; and a vertical distance between the coolant path segment and the exhaust gas path segment is defined by the thermal expansion bracket.

For purposes of illustration, the heat recovery assembly 100 is described with reference to a vehicle driven by an internal combustion engine 10 in the application. It is to be appreciated that the heat recovery assembly 100 may be used in other types of vehicles, including but not limited to HEV, PHEV, etc.

Referring to FIG. 1, the vehicle 1 may include an engine 10. Combusted gas may be exhausted from the engine during operation. In FIG. 1, a gas flow is generally represented by a hollow arrow. Exhaust gas 115 at a high temperature is routed to the exterior of the engine 10 via an exhaust system. The exhaust system may include various components (not shown) for reducing air pollutant emission and noise, and exhaust gas pipes to pass through the exhaust gas 115. When the exhaust gas 115 flows through the exhaust system, the heat may be delivered to various components, exhaust pipes, and surroundings of the exhaust system.

During engine operation, the temperature of the engine 10 rises due to combustion in the cylinders and friction between moving parts. The vehicle 1 driven by the engine 10 may include an engine coolant circuit 190 to control the temperature of the engine 10 and to adjust the cabin temperature. The flow path of the coolant in the coolant circuit 190 is illustrated with lines having thin arrows. The engine coolant circuit 190 may include a pump (not shown) to circulate the coolant 125 within the coolant circuit 190. The coolant 125 flowing in the engine coolant circuit 190 may exchange heat with the engine 10 when passing through the engine 10. In one or more embodiments, the coolant circuit 190 may include a main coolant branch 190c and two branch coolant circuits 190a and 190b, that is, coolant cabin branch 190a and coolant radiator branch 190b. A valve 180 may be provided to distribute the coolant 125 between the coolant cabin branch 190a and the coolant radiator branch 190b. Optionally, a controller 170 may be provided to control the valve 180 to adjust the distribution of the coolant flow. Within the coolant cabin branch 190a, the coolant 125 may flow through a heater core 160 to transfer the heat from the coolant 125 to the cabin. The heater core 160 may be a part of a climate control system of the vehicle. Further, the coolant 125 may flow in the coolant radiator branch 190b. Within the coolant radiator branch 190b, the coolant 125 may flow through the radiator 140 exchanging heat with the surroundings. The radiator 140 may lower the temperature of the coolant 125, thus helping keep the temperature of the engine 10 below a preset threshold to prevent the engine 10 from overheating. In another embodiment, the radiator 140 and the heater core 160 may be both positioned with a single branch of the coolant circuit 190.

In one or more embodiments of the present disclosure, a heat recovery assembly 100 is provided to be connected to the exhaust gas pipe and the coolant tube. The heat recovery assembly 100 includes a thermal expansion bracket 130, which could automatically adjust a vertical distance between the exhaust gas path segment 110 and the coolant path segment 120 in response to the surrounding temperature. As such, the heat recovery assembly 100 may exchange heat as desired between the exhaust gas system and the coolant system. For instance, when the temperature of coolant 125 is lower than the engine temperature, the coolant 125 may absorb heat from the engine 10. When the temperature of coolant 125 flowing through the engine 10 is higher than the engine temperature, heat may be transferred from the coolant 125 to the engine 10. In one example, during a cold start condition, the temperature of the coolant 125 is similar to its surroundings. The coolant 125 may absorb heat from the exhaust gas via the heat recovery assembly 100 to deliver the heat to the engine 10, thereby speeding up the heating of the engine 10. By heating the coolant 125 with the waste heat of exhaust gas, the engine 10 may be heated faster as compared to the condition where the heat recovery assembly 100 is absent. As the engine 10 is heated to an optimized temperature such as 90 degrees, the heat delivered from the exhaust gas 115 to the coolant 125 needs to be reduced or eliminated to prevent the engine 10 from overheating. In one or more embodiments, the heat recovery assembly 100 may increase the vertical distance between the coolant path segment and the exhaust gas path segment at a hot condition to reduce the heat delivered from the exhaust gas 115 to the coolant 125. FIG. 2 through 5 further schematically depict one or more embodiments of the heat recovery assembly.

Figure 2A:
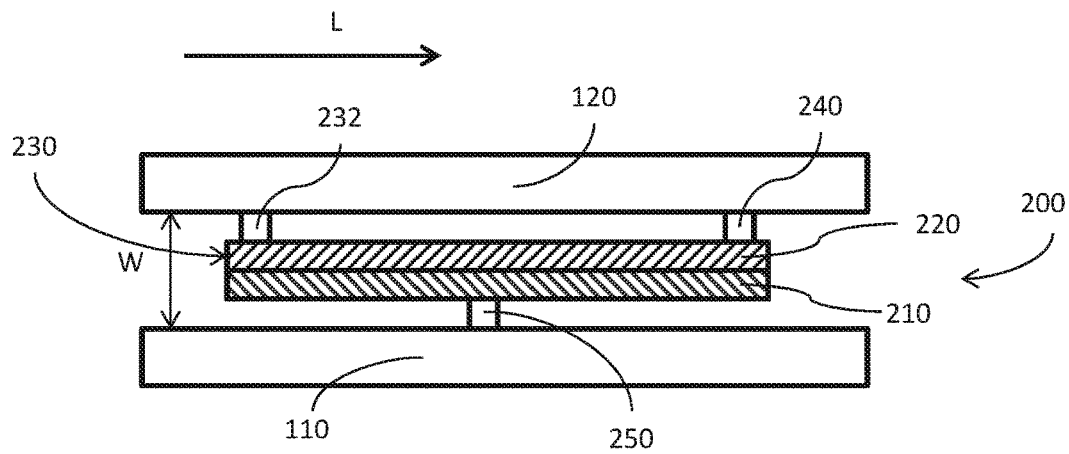
FIG. 2A schematically depicts a heat recovery assembly in the vehicle shown in FIG. 1, illustrating a thermal expansion bracket at a cold condition.
Figure 2B:
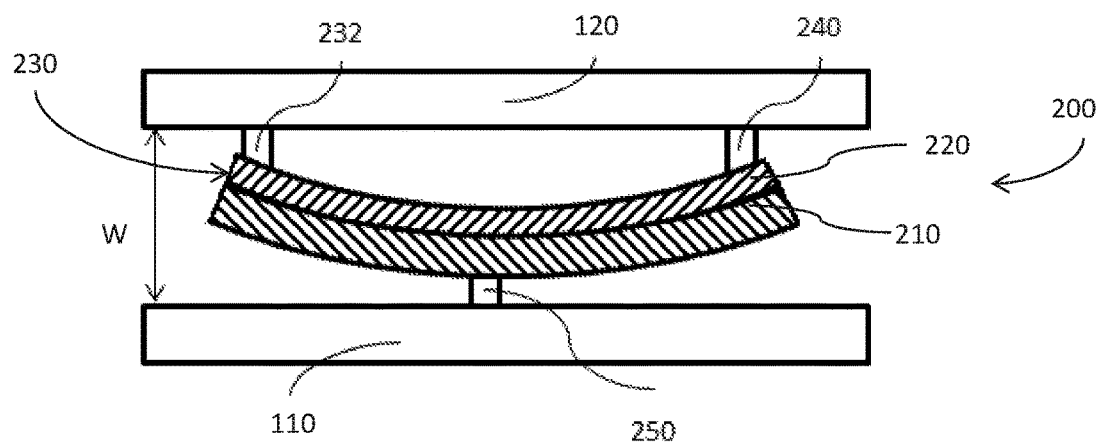
FIG. 2B depicts the heat recovery assembly in the vehicle shown in FIG. 1 illustrating the thermal expansion bracket at a hot condition.

Referring to FIGS. 2A and 2B, the heat recovery system may include a heat recovery assembly 200. The heat recovery assembly 200 is connected to the exhaust system and the coolant system. In one embodiment, the heat recovery assembly 200 includes an exhaust gas path segment 110, a coolant path segment 120, and a thermal expansion bracket 230 connected between the exhaust gas path segment 110 and the coolant path segment 120. The thermal expansion bracket 230 may extend between the exhaust gas path segment 110 and the coolant path segment 120 along a direction (in the longitudinal direction L) substantially parallel to the length of the exhaust gas path segment 110 or the coolant path segment 120. FIG. 2A schematically depicts the heat recovery assembly 200 in a cold condition, and FIG. 2B schematically depicts the heat recovery assembly 200 in a hot condition. When the thermal expansion bracket 230 is in the cold condition as shown in FIG. 2A, the vertical distance W between the coolant path segment 120 and the exhaust gas path segment 110 is relatively small, thus more heat may be transferred from the exhaust gas path segment 110 to the coolant path segment 120. When the thermal expansion bracket 230 is the in hot condition as shown in FIG. 2B, the thermal expansion bracket 230 expands and elongates. Since both end portions of the thermal expansion bracket 230 are fixed, a displacement of the thermal expansion bracket 230 substantially occurs at a direction perpendicular to the direction L and thus increases the vertical distance W between the coolant path segment 120 and the exhaust gas path segment 110. Thus, less heat may be transferred from the exhaust gas path segment 110 to the coolant path segment 120.

In one or more embodiments, the thermal expansion bracket 230 may include a bimetallic strip. The bimetallic strip may consist of two metal strips with different thermal expansion characteristics which could convert a temperature change into mechanical displacement. Specifically, as depicted in FIG. 2A, the thermal expansion bracket 230 may include a first layer 210 with a first thermal expansion coefficient C1, and a second layer 220 with a second thermal expansion coefficient C2. The first thermal expansion coefficient C1 may be larger than the second thermal expansion coefficient C2. In one non-limiting example, the first layer 210 may include copper, and the second layer 220 may include steel. The first layer 210 and the second layer 220 may be joined together throughout their length in the longitudinal direction L or along their length by riveting, brazing, welding, or any other common methods of forming a bimetallic strip.

In this way, when in a cold condition such as during a cold start, the first layer 210 and second layer 220 of the thermal expansion bracket 230 are of similar length in the longitudinal direction L, and thus are of a substantially linear structure and in parallel with the coolant path segment 120 and the exhaust gas path segment 110. As the vehicle starts up, the temperatures of both the coolant 125 and the thermal expansion bracket 230 rise. Because the first thermal expansion coefficient C1 of the first layer 210 is larger than the second thermal expansion coefficient C2 of the second layer 220, the volumetric expansion of the first layer 210 is larger than the second layer 220, and the thermal expansion bracket 230 bends and generates a vertical displacement as depicted in FIG. 2B, increasing the vertical distance W between the coolant path segment 120 and the exhaust gas path segment 110. Therefore, the heat transferred from the exhaust gas path segment 110 to the coolant path segment 120 may be reduced or eliminated to prevent the coolant 125 from overheating and to further prevent the engine 10 from overheating.

In the embodiment depicted in FIGS. 2A and 2B, the first layer 210 may be positioned closer to the exhaust gas path segment 110 as compared with the second layer 220. In other words, the first layer 210 may be positioned between the second layer 220 and the exhaust gas path segment 110, or the second layer 220 may be positioned between the first layer 210 and the coolant path segment 120. This configuration is especially advantageous in that the first layer 210 with a larger thermal expansion coefficient is closer to the high temperature exhaust gas path segment 110 and is easy to deform, thereby reducing the heat transferred from the exhaust gas to the coolant, preventing the engine from overheating.

In one or more embodiments, the thermal expansion bracket 230 may be connected to the coolant path segment 120 at both end portions and may be connected to the exhaust gas route segment 110 at a middle portion between the two end portions. For example, the thermal expansion bracket 230 may include a first connector 232 and a second connector 240 spaced apart from each other in the longitudinal direction L which connect the two end portions of the second layer 220 to the coolant path segment 120 respectively, and a third connector 250. The thermal expansion bracket 230 may also include a third connector 250 positioned between the first connector 232 and the second connector 240 along the longitudinal direction L, and may connect the middle portion of the first layer 210 to the exhaust path segment 110. The first, second, and third connectors 232, 240, 250 may be connected with various parts by riveting, brazing, welding, etc. Further, the first connector 232 may include a male connector and a female connector (not shown) separately connected to the thermal expansion bracket 230 and the coolant path segment 120 and the male and female connectors may be detachably connected to each other by screw, bolt, clip, etc. Similarly, the second and third connector 240, 250 may be of similar structures. In this way, the thermal expansion bracket 230 may be detachably connected to the coolant path segment 120 and exhaust gas path segment 110. In another embodiment, the thermal expansion bracket 230 may be connected to the coolant path segment 120 and exhaust gas path segment 110 directly by welding, brazing, riveting, bonding, etc. In other words, the first, second, and/or third connector may be the connecting point of welding, brazing, riveting, bonding, etc.

Referring to FIGS. 1, 2A, and 2B, the vehicle may include an exhaust heat shield to prevent heat being transferred from the exhaust pipe to other vehicle parts. The heat shield may be adjacent to the exhaust pipe and be of rigid structure. In one embodiment, the exhaust gas path segment 110 may be formed as at least part of the exhaust heat shield. The thermal expansion bracket 230 may be connected to the exhaust heat shield. The heat from the exhaust gas may be transferred to the thermal expansion bracket 230 through the exhaust heat shield. Such structure may utilize the existing structure without redesigning the exhaust gas pipe, thereby reducing manufacturing cost. In another embodiment, the exhaust gas path segment 110 may be formed as part of the exhaust gas path, such as part of the exhaust pipe, as needed. Thus, the thermal expansion bracket 230 may be connected to the exhaust gas path segment 110, eliminating the space requirement for the exhaust heat shield.

In one embodiment, the coolant path segment 120 may be part of the coolant circuit 190. In other words, the coolant path segment 120 may be in fluid communication with the coolant circuit 190 and may form a portion of the coolant circuit 190. In one embodiment, the coolant path segment 120 may be of rigid structure to be connected to the thermal expansion bracket 230. Further, the coolant path segment 120 may be formed as part of the coolant cabin branch 190*a* of the coolant circuit 190, and in fluid communication with the heater core 160. It should be appreciated that the coolant path segment 120 may be formed as part of the coolant radiator branch 190*b*, or it may be formed as part of other branches or main circuit 190*c* as necessary.

Figure 3:
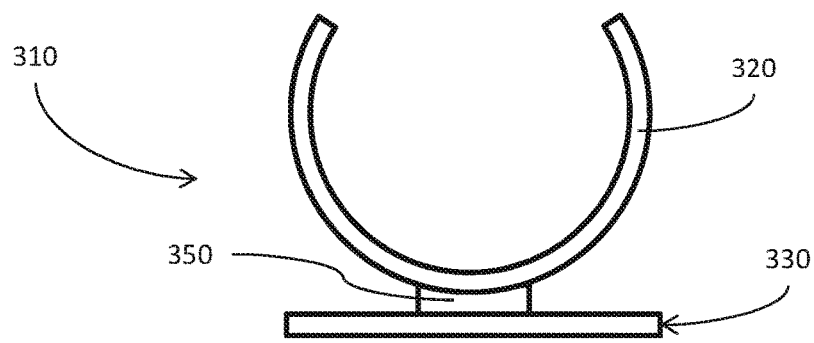
FIG. 3 schematically depicts a cross-sectional view of the heat recovery device according to one embodiment of the present disclosure.

FIG. 3 schematically depicts a cross-sectional view of the heat recovery assembly 310 according to one or more embodiments of the present disclosure. The heat recovery device 310 may include a coolant path segment 320 and a thermal expansion bracket 330. In one embodiment, the heat recovery device 310 may be of a similar longitudinal structure as shown in FIGS. 2A and 2B. In one embodiment, the coolant path segment 320 may include a rigid material, and has a concave shape at a surface opposite to the thermal expansion bracket 330 to housing the coolant circuit or coolant tube. Two end portions of the coolant path segment 320 may be connected together with the thermal expansion bracket 330 via connector 350 or any other method (e.g., welding, brazing, riveting, bonding). Part of the coolant tube may be positioned on the concave surface of the coolant path segment 320 without necessarily changing the structure of the coolant circuit. This structure is especially advantageous in small vehicles with limited space, because the coolant circuit may utilize flexible tubing to make full use of limited space in some instances. The structure according to the embodiment may utilize the existing structure of the coolant circuit without necessarily forming a portion of the coolant circuit into a rigid structure connected with the thermal expansion bracket, thereby providing optimized usage of the limited space.

Figure 4A:
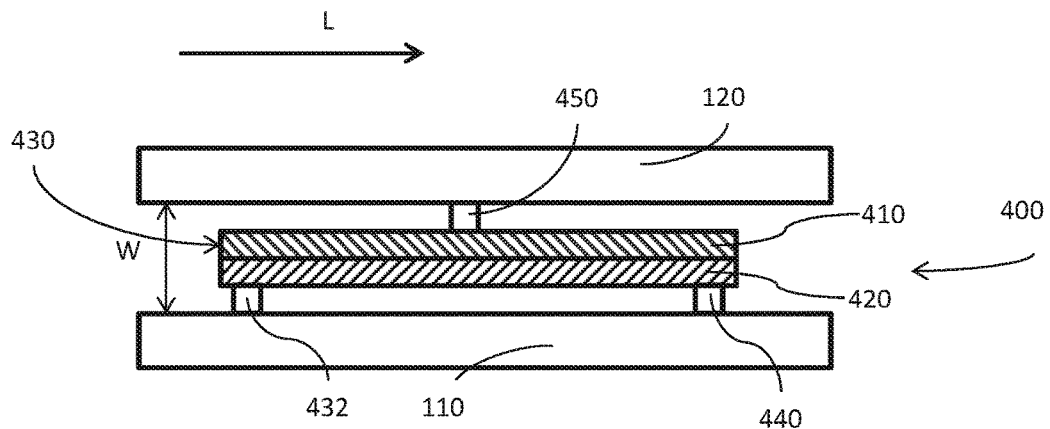
FIG. 4A schematically depicts a cross-sectional view of the heat recovery device according to another embodiment of the present disclosure with the thermal expansion bracket being at cold condition.
Figure 4B:
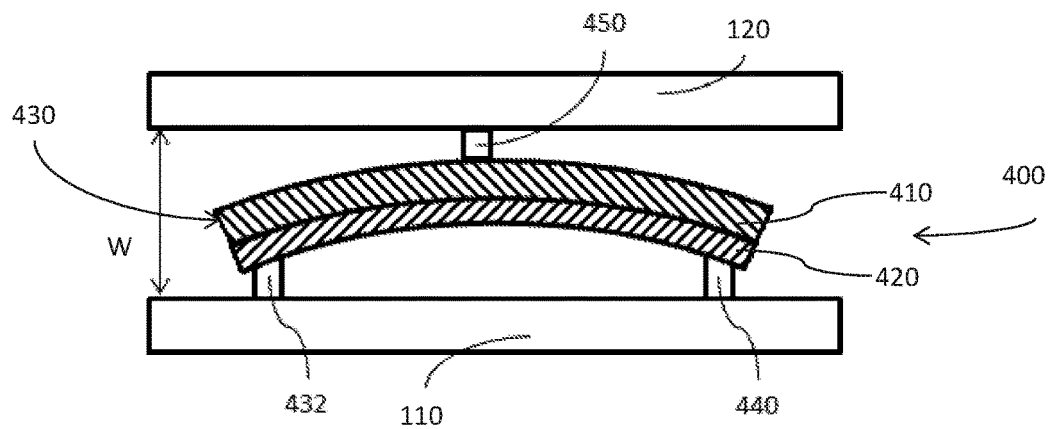
FIG. 4B schematically depicts a cross-sectional view of the heat recovery device as referenced in FIG. 4A with the thermal expansion bracket being at hot condition.

FIGS. 4A and 4B schematically depict an exhaust gas heat recovery assembly 400 according to yet another one or more embodiments. As shown in FIGS. 4A and 4B, the thermal expansion bracket 430 may be connected to the exhaust gas path segment 110 at two end portions, and connected to the coolant path segment 120 at a middle portion between the two end portions. Specifically, the first connector 432 and the second connector 440 may connect two end portions of the second layer 420 to the exhaust gas path segment 110, and the third connector 450 may connect the middle portion of the first layer 410 to the coolant path segment 120. In another embodiment, the thermal expansion bracket 430 may be connected to the coolant path segment 120 and exhaust gas path segment 110 directly by welding, brazing, riveting, bonding, etc.

When the thermal expansion bracket 430 is in a cold condition as shown in FIG. 4A, the vertical distance W between the coolant path segment 120 and the exhaust gas path segment 110 is relatively small, thus more heat may be transferred from the exhaust gas path segment 110 to the coolant path segment 120. When the thermal expansion bracket 430 is in a hot condition as shown in FIG. 4B, the thermal expansion 430 expands and elongates. Since both end portions of the thermal expansion bracket 430 are fixed, a vertical displacement of the thermal expansion bracket 430 in a direction substantially perpendicular to the longitudinal direction L is generated to increase the vertical distance W between the coolant path segment 120 and the exhaust gas path segment 110. Thus, less heat may be transferred from the exhaust gas path segment 110 to the coolant path segment 120.

Figure 5A:
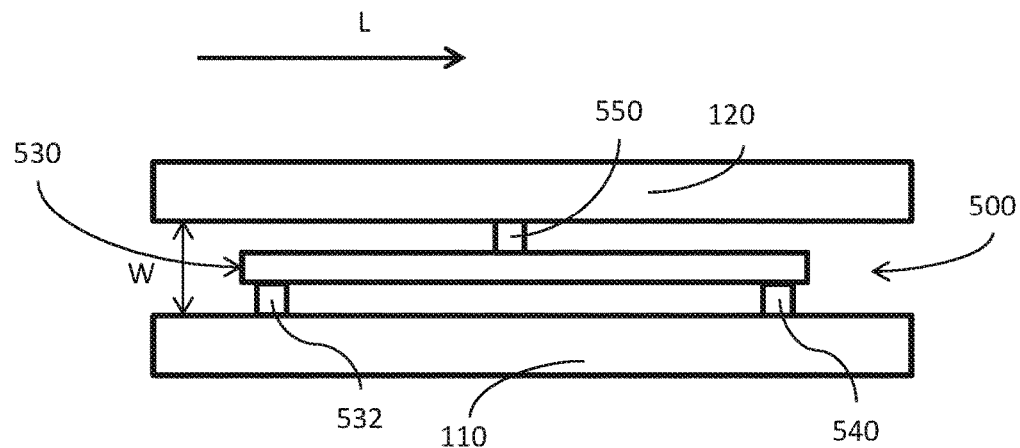
FIG. 5A schematically depicts a cross-sectional view of the heat recovery device according to yet another embodiment of the present disclosure with the thermal expansion bracket being at cold condition.
Figure 5B:
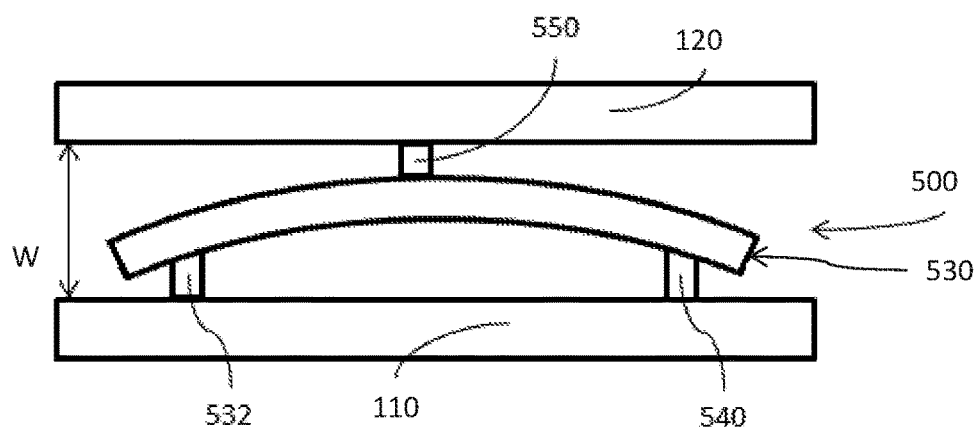
FIG. 5B schematically depicts a cross-sectional view of the heat recovery device as referenced in FIG. 5A with the thermal expansion bracket being at hot condition.

FIGS. 5A and 5B schematically depict an exhaust gas recovery assembly 500 according to yet another embodiment of the present invention. As shown in FIGS. 5A and 5B, the thermal expansion bracket 530 may be of a structure other than a bimetallic strip. For example, the thermal expansion bracket 530 may include a material with a single large thermal expansion coefficient. Similarly, the thermal expansion bracket 530 may be fixed to the exhaust gas path segment 110 via a first connector 532 and a second connector 540, and may be fixed to the coolant path segment 120 via a third connector 550. In this way, in the cold condition as shown in FIG. 5A, the thermal expansion bracket 530 may remain substantially parallel to the exhaust path segment 110 and coolant path segment 120. The vertical distance W between the coolant path segment 120 and the exhaust gas path segment 110 is relatively small, thus more heat may be transferred from the exhaust gas path segment 110 to the coolant path segment 120. When the thermal expansion bracket 530 is in the hot condition as shown in FIG. 5B, the thermal expansion 530 expands and elongates. Since both end portions of the thermal expansion bracket 530 are fixed, a vertical displacement of the thermal expansion bracket 530 in a direction substantially perpendicular to the longitudinal direction L is generated to increase the vertical distance W between the coolant path segment 120 and the exhaust gas path segment 110. Thus, less heat may be transferred from the exhaust gas path segment 110 to the coolant path segment 120.

It is to be appreciated that alternatively, the thermal expansion 530 may be connected to the coolant path segment 120 at both end portions via a first connector and a second connector, and may be connected to the exhaust gas path segment 110 at a middle portion via a third connector.

In one or more embodiments, the present disclosure provides a heat recovery device for a vehicle and an assembly including the same. One skilled in the art will readily recognize from such discussion, and from the accompanying drawings and claims that various changes, modifications and variations can be made therein without departing from the true spirit and fair scope of the invention as defined by the following claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A heat recovery device comprising:
    a coolant path segment; and
    a thermal expansion bracket
        having two end portions supported by the coolant path segment and a middle portion supported by an exhaust gas path segment that is spaced a distance away from the coolant path segment, and
        configured to deform in response to an increase in temperature to increase the distance and decrease heat transfer between the segments.

2. The heat recovery device of claim 1, wherein the thermal expansion bracket is configured to be parallel to the coolant path segment in response to the temperature being less than a threshold.

3. The heat recovery device of claim 1, wherein the thermal expansion bracket includes a bimetallic strip having layers with different thermal expansion coefficients.

4. The heat recovery device of claim 3, wherein a first of the layers is positioned closest to the exhaust gas path segment and has a thermal expansion coefficient greater than a thermal expansion coefficient of a second of the layers.

5. The heat recovery device of claim 4, wherein the first of the layers is copper and the second of the layers is steel.

6. A heat recovery assembly comprising:
    an exhaust gas path segment;
    a coolant path segment; and
    a thermal expansion bracket supported by the exhaust gas path segment and the coolant path segment such that a distance is defined between the segments, and having a bimetallic strip including layers with different thermal expansion coefficients,
    wherein the bracket is configured to deform and increase the distance in response to an increase in temperature, and two end portions of the bracket are supported by one the coolant path segment and the exhaust gas path segment via a first connector and a second connector spaced apart longitudinally, and a middle portion of the bracket is supported by the other of the coolant path segment and the exhaust gas path segment via a third connector positioned between the first connector and the second connector longitudinally.

7. The heat recovery assembly of claim 6, wherein the bimetallic strip includes a first layer with a first thermal expansion coefficient and a second layer with a second thermal expansion coefficient less than the first thermal expansion coefficient.

8. The heat recovery assembly of claim 7, wherein the first layer is arranged between the exhaust gas path segment and the second layer.

9. The heat recovery assembly of claim 7, wherein the first layer is copper and the second layer is steel.

10. The heat recovery assembly of claim 7, wherein two end portions of the second layer are supported by one of the coolant path segment and the exhaust gas path segment and a middle portion of the first layer is supported by the other of the coolant path segment and the exhaust gas path segment.

11. The heat recovery assembly of claim 6, wherein the exhaust gas path segment is formed as one of a portion of an exhaust gas pipe or as an exhaust heat shield of an exhaust pipe of a vehicle.

12. The heat recovery assembly of claim 6, wherein the coolant path segment is formed as a rigid part to receive a portion of a coolant path.

13. The heat recovery assembly of claim 6, wherein the coolant path segment is in fluid communication with a cabin heater core or an engine coolant circuit of a vehicle such that it is formed as a portion of the engine coolant circuit.

14. The heat recovery assembly of claim 6, wherein the thermal expansion bracket is parallel to the coolant path segment and the exhaust gas path segment at a cold condition, and deforms to generate a vertical displacement at a hot condition in response to a temperature increase such that a vertical distance between the segments is increased.

* * * * *